(12) United States Patent
Lin (10) Patent No.: US 7,766,650 B2
(45) Date of Patent: Aug. 3, 2010

(54) GAS-POWERED TOOL

(76) Inventor: Arlo Lin, No. 68, Kung Yeh 32$^{nd}$ Road, Industrial Park, Taichung (TW)

( * ) Notice: Subject to any disclaimer, the term of this patent is extended or adjusted under 35 U.S.C. 154(b) by 286 days.

(21) Appl. No.: 11/466,287

(22) Filed: Aug. 22, 2006

(65) Prior Publication Data

US 2006/0278213 A1 Dec. 14, 2006

Related U.S. Application Data

(63) Continuation-in-part of application No. 11/050,916, filed on Feb. 4, 2005, now Pat. No. 7,510,394.

(51) Int. Cl.
*F23D 14/28* (2006.01)
*G05D 23/10* (2006.01)

(52) U.S. Cl. .................. 431/344; 236/48 R; 251/11

(58) Field of Classification Search .................. 251/11; 236/48 R; 431/344; 126/226, 238, 234, 126/52
See application file for complete search history.

(56) References Cited

U.S. PATENT DOCUMENTS

| | | | |
|---|---|---|---|
| 1,764,659 A | 6/1930 | Stokes | |
| 2,233,659 A | 3/1941 | Wittmann | 137/65 |
| 2,271,850 A | 2/1942 | Zinkil | 236/80 R |
| 2,283,903 A | 5/1942 | Ashcraft | 335/217 |
| 2,285,913 A | 6/1942 | Derrah | 236/68 B |
| 2,329,116 A * | 9/1943 | Heilman | 99/281 |
| 2,390,985 A * | 12/1945 | Boyer | 431/59 |
| 2,407,170 A | 9/1946 | Malek | 431/58 |
| 2,425,007 A | 8/1947 | Rouse | 91/459 |
| 2,461,615 A | 2/1949 | Taylor | 137/492 |
| 2,601,579 A | 6/1952 | Wittmann | |
| 2,747,832 A | 5/1956 | Vischer | 251/161 |
| 2,777,662 A | 1/1957 | Hansen | 251/11 |
| 2,960,303 A * | 11/1960 | Smallpeice | 251/11 |
| 3,042,363 A | 7/1962 | Deeks | 251/362 |
| 3,229,956 A * | 1/1966 | White | 251/11 |
| 3,346,231 A * | 10/1967 | Wall | 251/11 |
| 3,587,963 A | 6/1971 | Vanderlann et al. | |
| 3,704,697 A | 12/1972 | Weymann | 123/406.7 |
| 3,856,259 A * | 12/1974 | Doherty, Jr. | 251/11 |
| 3,930,613 A * | 1/1976 | Place | 236/48 R |
| 4,027,848 A * | 6/1977 | Mundil | 251/11 |
| 4,060,193 A | 11/1977 | Foller | 236/59 |

(Continued)

OTHER PUBLICATIONS

Chinese Utility Model Publication No. CN 2322174 Y, Jun. 2, 1999, 11 pages.

(Continued)

*Primary Examiner*—Kenneth B Rinehart
*Assistant Examiner*—Chuka C Ndubizu
(74) *Attorney, Agent, or Firm*—Alan Kamrath; Kamrath & Associates PA (57) ABSTRACT

A controller includes a shell, a valve, a temperature-sensitive regulator and a cover. The shell defines an intake, a first space in communication with the intake, a second space in communication with the first space and an outlet in communication with the second space. The valve is installed in the first space for shutting the intake. The temperature-sensitive regulator is installed in the second space for contact with the valve. The cover is used to shut the second space and contact the temperature-sensitive regulator.

5 Claims, 7 Drawing Sheets

U.S. PATENT DOCUMENTS

| | | | |
|---|---|---|---|
| 4,142,553 A | 3/1979 | Sakakibara et al. | 137/625.44 |
| 4,142,676 A * | 3/1979 | Hattori | 236/87 |
| 4,386,732 A * | 6/1983 | Satomoto | 236/48 R |
| 4,456,216 A * | 6/1984 | Boruta | 251/11 |
| 4,474,212 A | 10/1984 | Schmitz | 137/614.11 |
| 5,058,856 A * | 10/1991 | Gordon et al. | 251/11 |
| 5,178,530 A | 1/1993 | Roldan et al. | 431/75 |
| 5,259,412 A | 11/1993 | Scott et al. | 137/58 B |
| 5,325,880 A * | 7/1994 | Johnson et al. | 137/1 |
| 5,337,718 A | 8/1994 | Tuckey | |
| 5,398,655 A | 3/1995 | Tuckey | |
| 5,509,390 A | 4/1996 | Tuckey | |
| 5,551,723 A | 9/1996 | Mahon et al. | 280/737 |
| 5,579,739 A | 12/1996 | Tuckey et al. | |
| 5,720,055 A | 2/1998 | Krist | |
| 5,785,295 A * | 7/1998 | Tsai | 251/11 |
| 5,799,648 A | 9/1998 | Oglesby et al. | |
| 5,838,351 A * | 11/1998 | Weber | 347/85 |
| 5,954,079 A * | 9/1999 | Barth et al. | 137/13 |
| 6,745,995 B2 | 6/2004 | Hu et al. | 251/81 |
| 7,168,597 B1 | 1/2007 | Jones et al. | 222/402.2 |
| 7,192,001 B2 * | 3/2007 | Wise et al. | 251/11 |
| 2002/0079474 A1 | 6/2002 | Del Garbino et al. | 251/212 |
| 2005/0001182 A1 * | 1/2005 | Wise et al. | 251/11 |

OTHER PUBLICATIONS

German Patent Publication No. DE 102005040332 A1, Jun. 14, 2006, 19 pages.

* cited by examiner

GAS-POWERED TOOL

CROSS-REFERENCE

The present application is a continuation-in-part application of U.S. patent application Ser. No. 11/050,916 filed on Feb. 4, 2005, now U.S. Pat. No. 7,510,394.

BACKGROUND OF INVENTION

1. Field of Invention

The present invention relates to a gas-powered tool and, more particularly, to a controller for controlling the supply of gas in such a gas-powered tool.

2. Related Prior Art

As disclosed in U.S. Pat. No. 5,799,648 issued on Sep. 1, 1998, a gas-powered tool 1 includes a handle 2, a barrel 6 extending from the handle 2, a head 4 connected to the barrel 6 and a tip 8 extending from the head 4. The handle 2 and the head 4 both are hollow. A reservoir 23 is located in the handle 2 for storing gas. A combustor 10 is located in the head 4 for burning the gas. A controller 28 is located in the barrel 6 for controlling the supply of the gas to the combustor 10 from the reservoir 23. A switch 32 is located between the reservoir 23 and the controller 28 for switching on/off the supply of the gas to the controller 28 from the reservoir 23. A throttle 29 is located in the barrel 6 for controlling the flow rate of the gas to the combustor 10 from the reservoir 23. The controller 28 includes a valve 39, a first element 70, a second element 71 and a permanent magnet 63 located between the first element 70 and the second element 71. The first element 70 is made of thermo-magnetic material. The second element 71 is made of magnetic material. The magnetic attraction between the permanent magnet 63 and the first element 70 is larger than the magnetic attraction between the permanent magnet 63 and the second element 71 when the first element 70 is magnetic. Thus, the valve 39 is open so that the gas goes into the combustor 10 from the reservoir 23 through the valve 39. The first element 70 becomes non-magnetic when the temperature reaches a limit. Therefore, the magnetic attraction between the permanent magnet 63 and the second element 71 is greater than the magnetic attraction between the permanent magnet 63 and the first element 70. Thus, the valve 39 is closed so that the gas goes into the combustor 10 from the reservoir 23 through the throttle 29. This conventional gas-powered tool 1 is, however, complicated in structure, difficult in fabrication and high in cost.

The present invention is therefore intended to obviate or at least alleviate the problems encountered in the prior art.

SUMMARY OF INVENTION

A controller includes a shell, a valve, a temperature-sensitive regulator and a cover. The shell defines an intake, a first space in communication with the intake, a second space in communication with the first space and an outlet in communication with the second space. The valve is installed in the first space for shutting the intake. The temperature-sensitive regulator is installed in the second space for contact with the valve. The cover is used to shut the second space and contact the temperature-sensitive regulator.

The primary advantage of the controller according to the present invention is to avoid the overheating of a tool equipped with the controller, thus preventing the tool from damage and protecting the user from injury.

Other advantages and features of the invention will become apparent from the detailed description taken in conjunction with the drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 6:
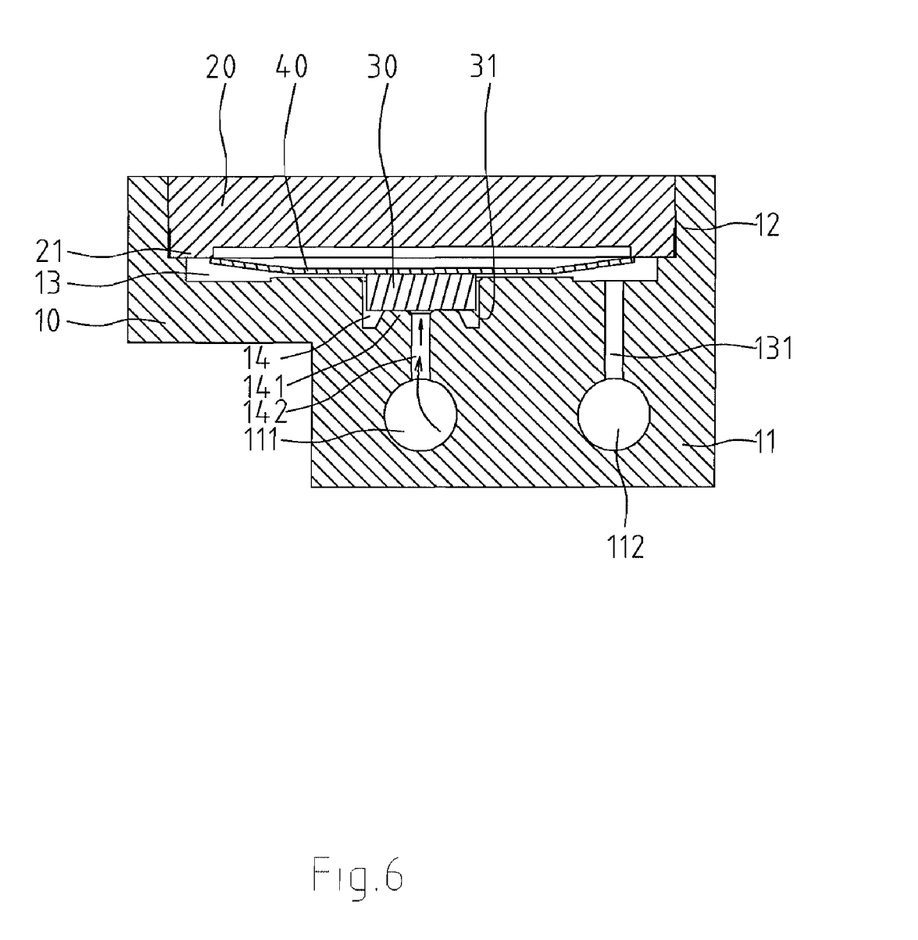
FIG. 6 is a cross-sectional view of the controller in another position than shown in FIG. 5.
Figure 7:
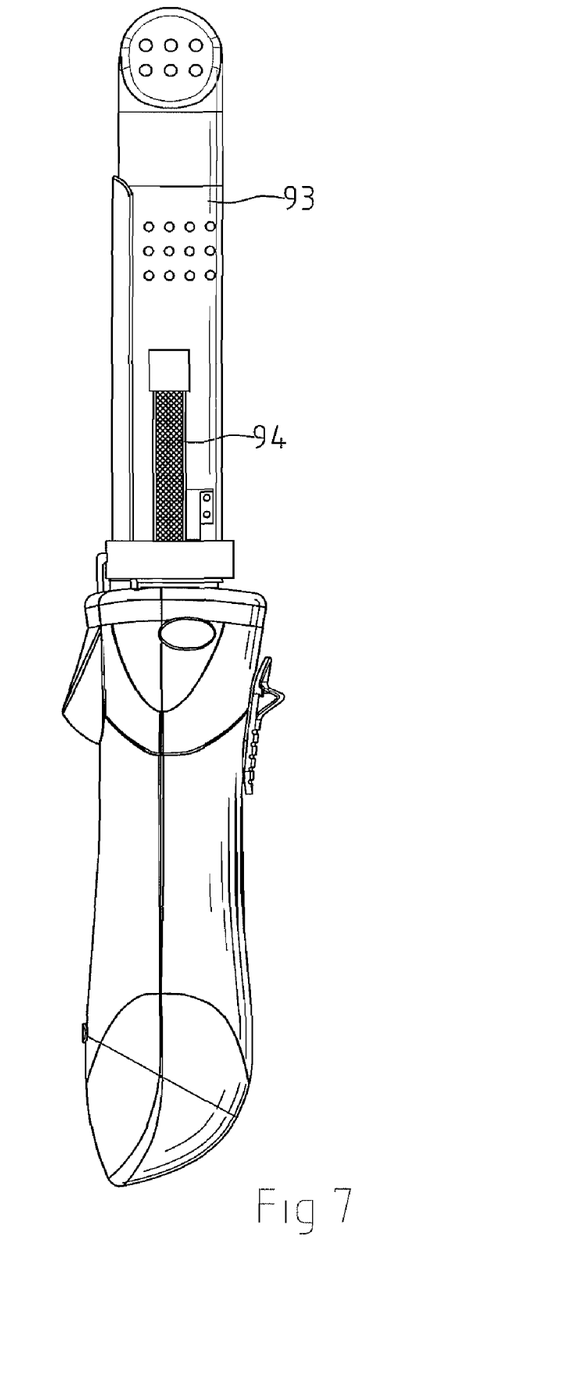
FIG. 7 is a side view of a gas-powered tool.

Shown in FIG. 7 is a gas-powered crimping apparatus 93 equipped with a catalyst 94. The gas-powered crimping apparatus 93 is powered by the combustion of gas stored therein. The supply of the gas is controlled by a controller according to the preferred embodiment of the present invention referring to FIGS. 1 through 6.

Figure 1:
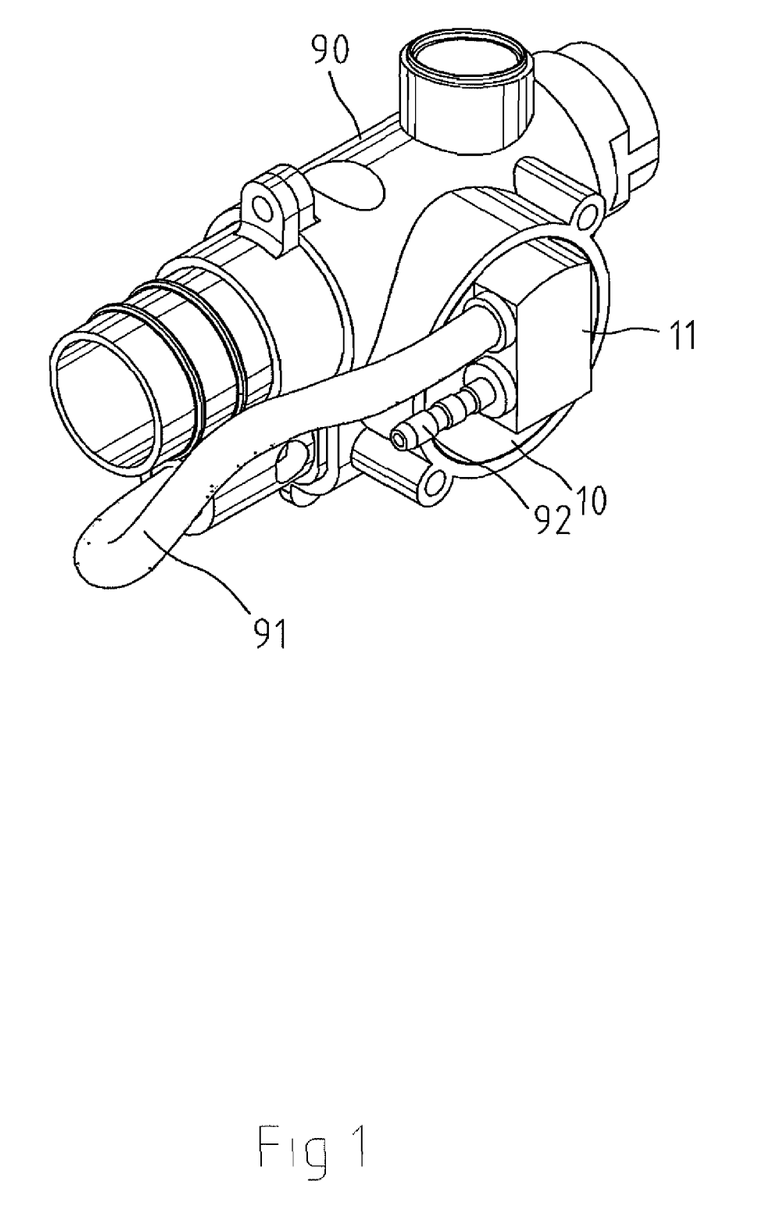
FIG. 1 is a perspective view of a controller for use in a gas-powered tool according to the preferred embodiment of the present invention.

Referring to FIG. 1, the gas-powered crimping apparatus 93 includes a combustor 90. The controller is used for controlling the transmission of the gas into the combustor 90.

Figure 2:
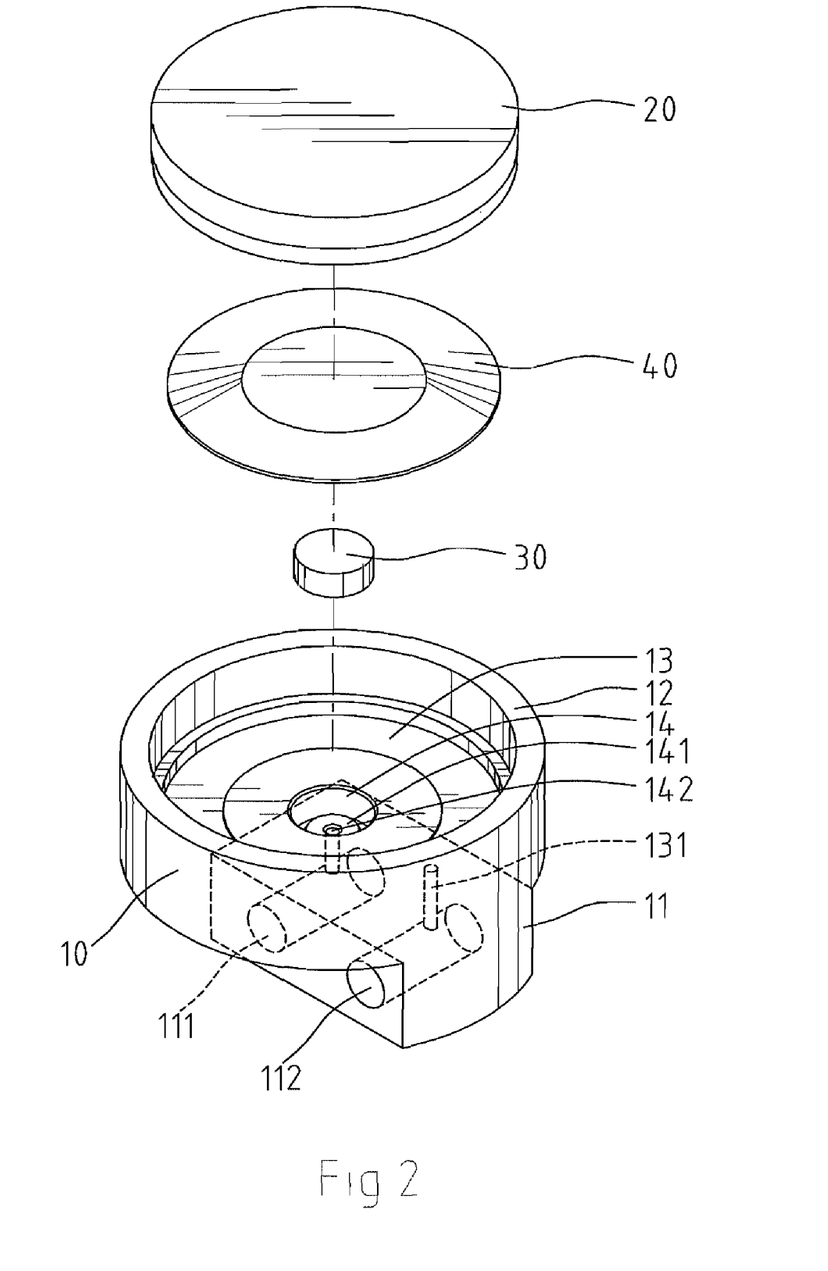
FIG. 2 is an exploded view of the controller shown in FIG. 1.
Figure 3:
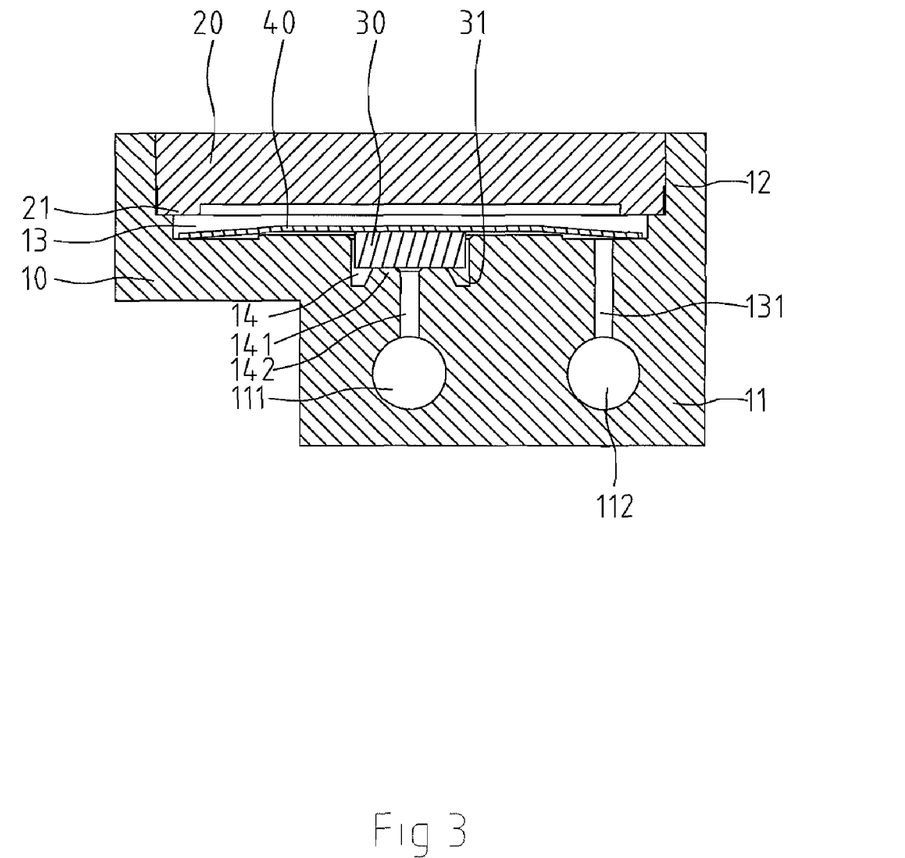
FIG. 3 is a cross-sectional view of the controller of FIG. 1.

Referring to FIGS. 2 and 3, the controller includes a shell 10, a valve 30, a temperature-sensitive regulator 40 and a cover 20.

The shell 10 is attached to the combustor 90. The shell 10 includes a first portion 11 and a second portion 12. The first portion 11 of the shell 10 defines an intake 111 and an outlet 112. A joint 92 is inserted in each of the intake 111 and the outlet 112. A pipe 91 is connected to each of the joints 92. One of the pipes 91 is connected to a reservoir for gas while the other pipe 91 is connected to the combustor 90. The second portion 12 of the shell 10 defines a second, large space 13 and a first, small space 14 in communication with the second, large space 13. There is a channel 142 for communicating the intake 111 with the first, small space 14. An annular ridge 141 is fowled on the floor of the first, small space 14 around the channel 142. There is a channel 131 for communicating the outlet 112 with the second, large space 13.

The valve 30 is movably installed in the small space 14. The valve 30 includes a lower face 31 and an upper face. The lower face 31 of the valve 30 is used for air-tight contact with the annular ridge 141. When the lower surface 31 of the valve 30 is rested on the annular ridge 141, the upper face of the valve 30 is located outside the small space 14.

The temperature-sensitive regulator 40 is located in the large space 13 for contact with the valve 30. As shown and discussed in U.S. Patent Publication No. U.S. 2006-0174865 A1 of which the entire disclosure is incorporated herein, the temperature-sensitive regulator 40 is a laminate consisting of two metal layers with different coefficients of thermal expansion.

The cover 20 is installed in the large space 13. The cover 20 includes a lower face, an upper face and an annular ridge 21 formed on the lower face. The annular ridge 21 is used for contact with the temperature-sensitive regulator 40.

Referring to FIG. 3, the temperature-sensitive regulator 40 includes a convex-concave shape. That is, the center of the temperature-sensitive regulator 40 protrudes upwards while the edge of the same bends downwards. The edge of the temperature-sensitive regulator 40 is not in contact with the annular ridge 21.

Figure 4:
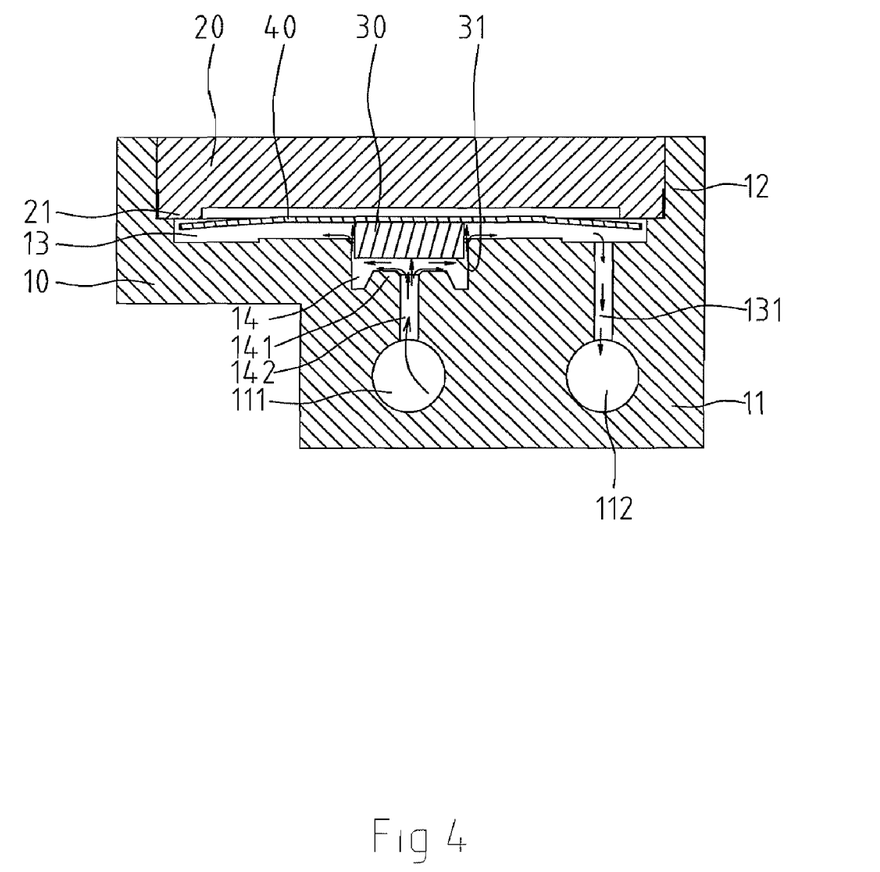
FIG. 4 is a cross-sectional view of the controller in another position than shown in FIG. 3.

Referring to FIG. 4, the gas goes into the small space 14 through the channel 142 and the intake 111. The gas lifts the valve 30 from the annular ridge 141. A gap between the valve 30 and the annular ridge 141 is large. In turn, the valve 30 lifts the temperature-sensitive regulator 40 from the floor of the large space 13. The gas goes all the way through the intake 111, the channel 142, the small space 14, the large space 13, the channel 131 and the outlet 112. The gas goes into the combustor 90 through the controller at a high rate so that the combustion of the gas takes place at a high rate in the combustor 90. The temperature rises fast.

Figure 5:
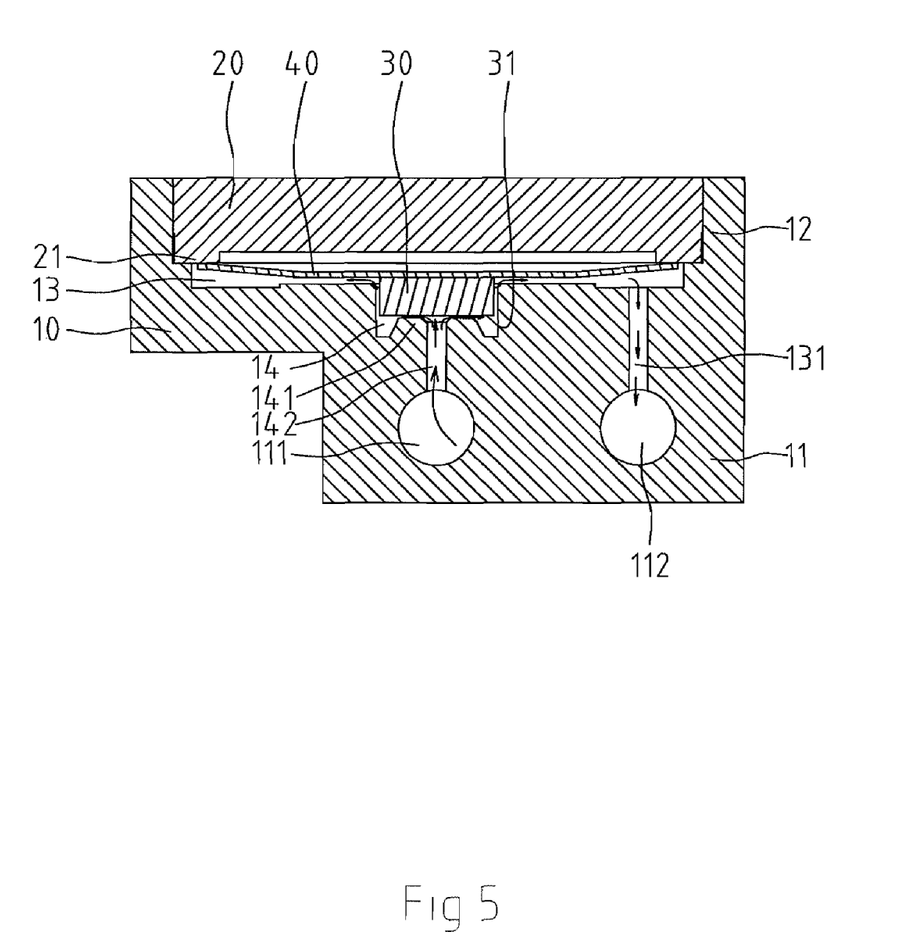
FIG. 5 is a cross-sectional view of the controller in another position than shown in FIG. 4.

Referring to FIG. 5, as the temperature of the temperature-sensitive regulator 40 reaches a predetermined value, the edge of the temperature-sensitive regulator 40 begins to bend upwards and contact the annular ridge 21 while the center of the same begins to protrude downwards and contact the valve 30 so that the gap between the valve 30 and the annular ridge 141 is reduced. The gas goes into the combustor 90 through the controller at a reduced rate. The combustion of the gas proceeds at a reduced rate in the combustor 90.

Referring to FIG. 6, the temperature of the temperature-sensitive regulator 40 gets too high so that the edge of the temperature-sensitive regulator 40 is in firm contact with the annular ridge 21 while the center of the same is in firm contact with the valve 30 so that the gap between the valve 30 and the annular ridge 141 is eliminated. The gas does not go into the combustor 90 through the controller at all. The combustion of the gas stops in the combustor 90. The rise of the temperature of the crimping apparatus 93 stops. A user is protected from getting burnt.

The primary advantage of the controller according to the present invention is to avoid overheating of the crimping apparatus, thus preventing the crimping apparatus from damage and protecting the user from injury.

The present invention has been described through the detailed illustration of the preferred embodiment. Those skilled in the art can derive variations from the preferred embodiment. Therefore, the preferred embodiment shall not limit the scope of the present invention defined in the claims.

What is claimed is:

1. A controller installed to a gas powered tool, with the controller comprising:
    a combustor;
    a shell defining an intake, a first space in communication with the intake and formed with an annular ridge, a second space interconnected to the first space and an outlet in communication with the second space and with the combustor, with the first space being defined by an annular wall having cross sections, with the second space being defined by an annular wall having cross sections larger than and parallel to the cross sections of the first space;
    a valve received in the first space, with the valve moveable between a lifted position, a mid-position and a stop position, with the valve in the lifted position creating a gap with the inlet, with the valve in the mid-position reducing the gap and the gas going into the combustor through the controller at a reduced rate, with the valve in the stop position eliminating the gap with and shutting the intake, with the first and second spaces being intermediate the inlet and the outlet, with the inlet being in communication through the first space, then through the second space and then to the outlet with the valve in the lifted position;
    a temperature-sensitive regulator installed within the second space for contact with the valve, with the temperature-sensitive regulator having a free peripheral edge, with the free peripheral edge located within the annular wall of the second space and free of interconnection with the shell; and
    a cover for shutting the second space and contacting the temperature-sensitive regulator, with the cover having an annular ridge for contact with the temperature-sensitive regulator;
    wherein while the gas goes into the first space and lifts the valve, the gap between the valve and the annular ridge of the first space has a first width, with the valve lifting the temperature-sensitive regulator and being in the lifted position, and with the gas going into the combustor through the controller at a first rate;
    wherein when temperature of the temperature-sensitive regulator reaches a first predetermined value, the free peripheral edge of the temperature-sensitive regulator begins to bend upwards and contact with the annular ridge of the cover and the gap between the valve and the annular ridge of the first space has a second width which is reduced from the first width for driving the valve to the mid-position, with the gas going into the combustor through the controller at the reduced rate which is reduced from the first rate;
    wherein when the temperature of the temperature-sensitive regulator reaches a second predetermined value which is larger than the first predetermined value, the edge of the temperature-sensitive regulator is in firm contact with the annular ridge of the cover while a center of the temperature-sensitive regulator is in firm contact with the valve, wherein the gap between the valve and the annular ridge of the first space is eliminated for driving the valve to the stop position, and the gas is not going into the combustor through the controller at all.

2. The controller according to claim 1 wherein the shell defines a channel communicating the intake with the first space.

3. The controller according to claim 2 wherein the shell comprises the annular ridge on a floor of the first space around the channel, with the annular ridge being in contact with the valve.

4. The controller according to claim 1 wherein the shell defines a channel communicating the second space with the outlet.

5. The controller according to claim 1 wherein the temperature-sensitive regulator is a laminate consisting of two metal layers with different coefficients of thermal expansion.

* * * * *